United States Patent [19]

Jouffroy et al.

[11] Patent Number: 4,460,545
[45] Date of Patent: Jul. 17, 1984

[54] ENERGY-SAVING DEVICE FOR MANUFACTURING POLYETHYLENE

[75] Inventors: Guy Jouffroy, Saint Arnoult; Bernard Martinot, Lillebonne, both of France

[73] Assignee: Societe Chimique des Charbonnages-CdF Chimie, France

[21] Appl. No.: 280,535

[22] Filed: Jul. 6, 1981

Related U.S. Application Data

[63] Continuation of Ser. No. 16,540, Mar. 1, 1979, abandoned.

[30] Foreign Application Priority Data

Mar. 2, 1978 [FR] France .................. 78 06030

[51] Int. Cl.³ .............................................. B01J 12/02
[52] U.S. Cl. ................................ 422/131; 60/648; 60/649; 422/187; 422/235; 525/53; 526/65
[58] Field of Search .................... 422/131–137, 422/187, 235; 525/53; 526/65; 60/648, 649; 415/202

[56] References Cited

U.S. PATENT DOCUMENTS

| | | | |
|---|---|---|---|
| 1,448,893 | 5/1923 | Wiki | 415/202 |
| 1,858,043 | 5/1932 | Glass | 415/202 |
| 2,013,087 | 3/1935 | Cornell, Jr. | 415/202 |
| 2,733,044 | 1/1956 | Danel | 415/202 |
| 3,649,208 | 3/1972 | Hornschuch | 422/134 |
| 3,879,949 | 4/1975 | Hays et al. | 60/649 |
| 4,106,294 | 8/1978 | Czaja | 60/649 |
| 4,215,207 | 7/1980 | Durand et al. | 526/65 |
| 4,273,743 | 6/1981 | Barber et al. | 422/187 |

Primary Examiner—Michael S. Marcus
Attorney, Agent, or Firm—Finnegan, Henderson, Farabow, Garrett & Dunner

[57] ABSTRACT

Polyethylene is produced in at least one reactor under a pressure of 800 to 2500 bars and a temperature of 150° to 350° C., and the reaction mixture exiting the reactor through an expansion valve and supplied to a separator under a pressure of 50 to 400 bars is cooled by passing a flow Q of the mixture through a turbine. The turbine comprises at least one stage with a fixed nozzle and a bladed wheel having a rotation speed of between 12,000 and 40,000 r.p.m. Ethylene discharged from the separator is recycled to the inlet of a compressor, and the discharge from the compressor is supplied to the reactor.

10 Claims, 7 Drawing Figures

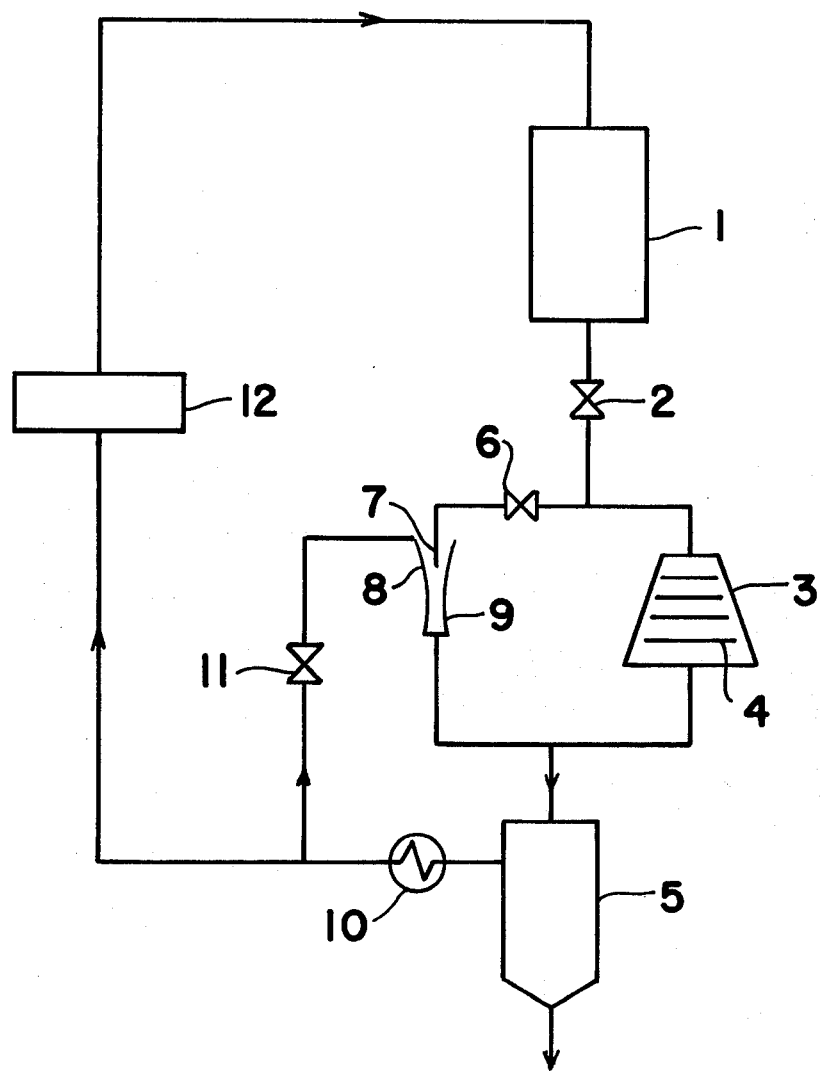
FIG. I

ENERGY-SAVING DEVICE FOR MANUFACTURING POLYETHYLENE

This is a continuation of application Ser. No. 016,540, filed Mar. 1, 1979 now abandoned.

BACKGROUND OF THE INVENTION

The present invention relates to a process for the manufacture of polyethylene, and in particular to a process by which the major part of the enthalpy decrease available between the polymerisation reactor and the separator in which the polyethylene is separated from the ethylene can be recovered.

It is known that because of the increasing cost of energy, reduction in energy consumption has become of primary concern in industry. Despite this, very little effort has hitherto been dedicated to reducing energy consumption in installations for the manufacture of polyethylene, in which the reaction takes place under a very high pressure which is generally above about 800 bars. The enthalpy decrease available between this reaction pressure and the separation pressure, which is generally below 400 bars, is not usually recovered. U.S. Pat. No. 3,649,208 describes a process for compressing a fluid which consists in using a plurality of powered means for compressing fluid to effect production of a product, in admitting fluid and at least one constituent to said powered means, in causing a reaction to occur between said one constituent and fluid to initiate formation of the product from a portion of the fluid, in supplying means with a portion of the energy stored in said compressed fluid for powering given means of said plurality, and in separating the product from the remaining fluid. This process does apply to the manufacture of polyethylene and discloses a turbine as an example of means supplied with a portion of the energy stored in the compressed fluid. However it makes it possible to provide only up to 50% of the energy required for compressing the fluid, and, furthermore, the practical means for carrying out this process in industry and the operating conditions of these means are not described. Finally, this process involves a well-known restriction which consists in using all the recovered energy inside the installation for the manufacture of polyethylene.

SUMMARY AND DETAILED DESCRIPTION OF THE PREFERRED EMBODIMENTS OF THE INVENTION

It is an object of this invention to provide a process for the manufacture of polyethylene in which the major part of the enthalpy decrease available between the polymerisation reactor and the separator is recovered in such a way that it can be used independently of the polymerisation installation, and in which the means for recovering the enthalpy decrease simultaneously cool the mixture issuing from the reactor before it enters the separator.

According to the invention there is provided a process for the manufacture of polyethylene in at least one reactor under a pressure of 800 to 2,500 bars and at a temperature of 150° to 350° C., in which the mixture leaving the reactor through an expansion valve is supplied to a separator under a pressure of 50 to 400 bars and undergoes cooling between the valve and the separator, wherein the cooling is effected by passing a flow Q of the mixture leaving the reactor through a turbine consisting of at least one stage successively comprising a fixed nozzle and bladed wheel having a rotation speed of between 12,000 to 40,000 revolutions per minute, the mixture leaving the last stage of the turbine being supplied to the separator.

BRIEF DESCRIPTION OF THE DRAWINGS

FIG. 1 is a schematic flow diagram of an embodiment according to the invention.

When the turbine used in the above process comprises a single stage, the nozzle of the turbine must have a neck cross-section S such that $Q/S = P + 230/2,160$, P being the pressure of the mixture leaving the reactor and entering the turbine. (P is expressed in atmospheres, Q in metric tons per hour and S in square millimeters). Regardless of the number of stages, the wheels of the turbine can have different diameters, although identical diameters represent the simplest solution. In any case, these diameters should be chosen so that the peripherical speed of the wheel is always between 100 and 450 m/second. The turbine can advantageously be connected, via a speed reducer, to an electricity generator, driven at a rotation speed of 3,000 revolutions per minute, for the production of industrial current. Thus it is possible to use the recovered enthalpy decrease independently of the polymerisation installation.

Figure 3:
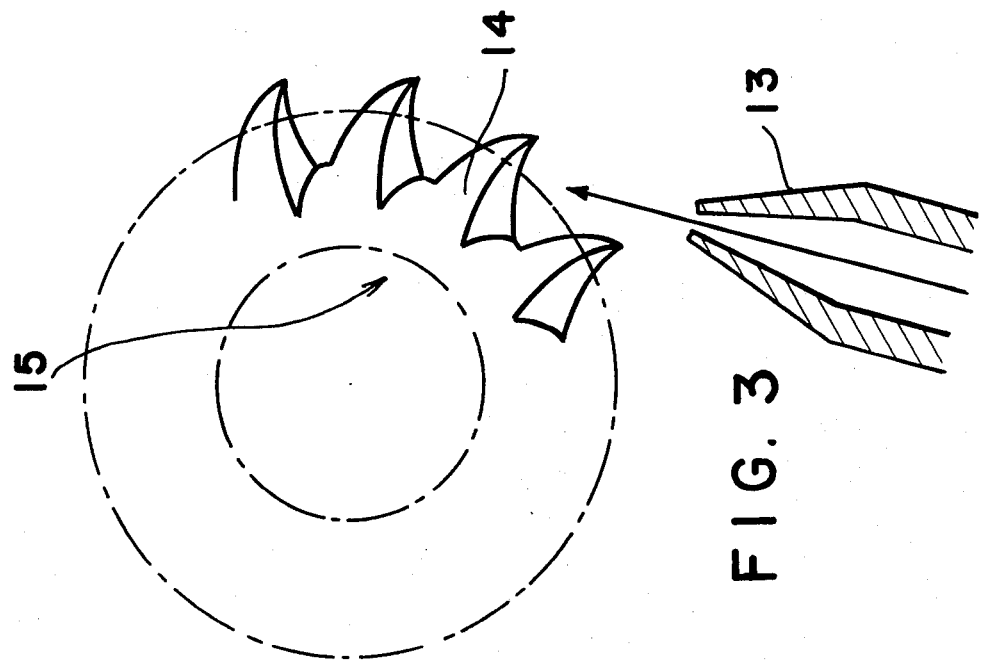
FIG. 3 is a schematic representation of the turbine of FIG. 2 along the axis b-b'.
Figure 2:
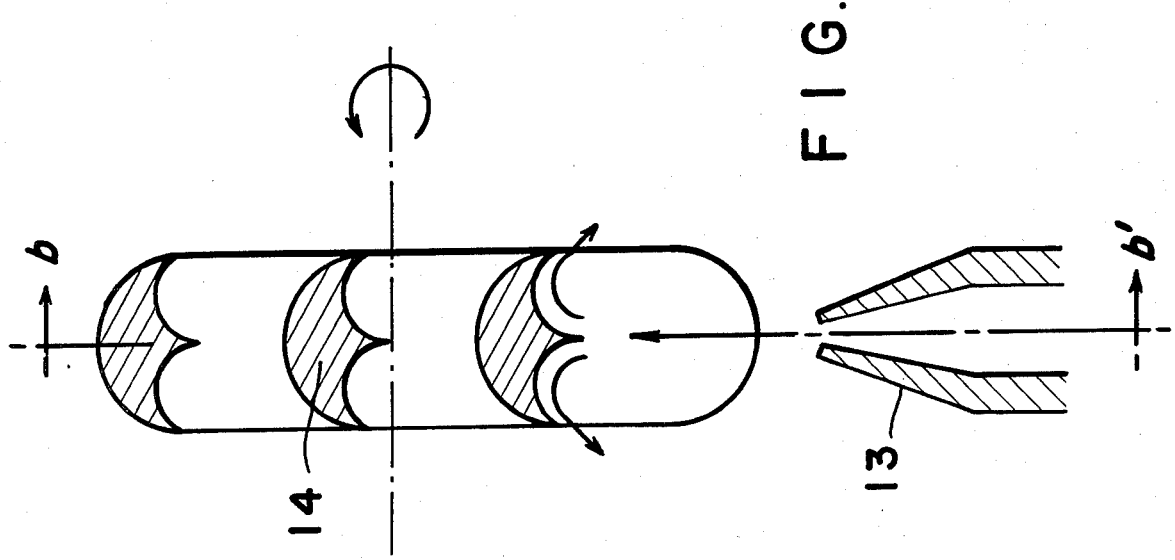
FIG. 2 is a schematic representation of a turbine that can be used in the present invention.
Figure 5:
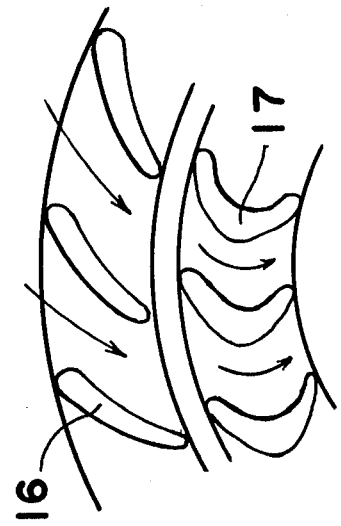
FIG. 5 is a schematic representation of the turbine of FIG. 4 along the axis b-b'.
Figure 4:
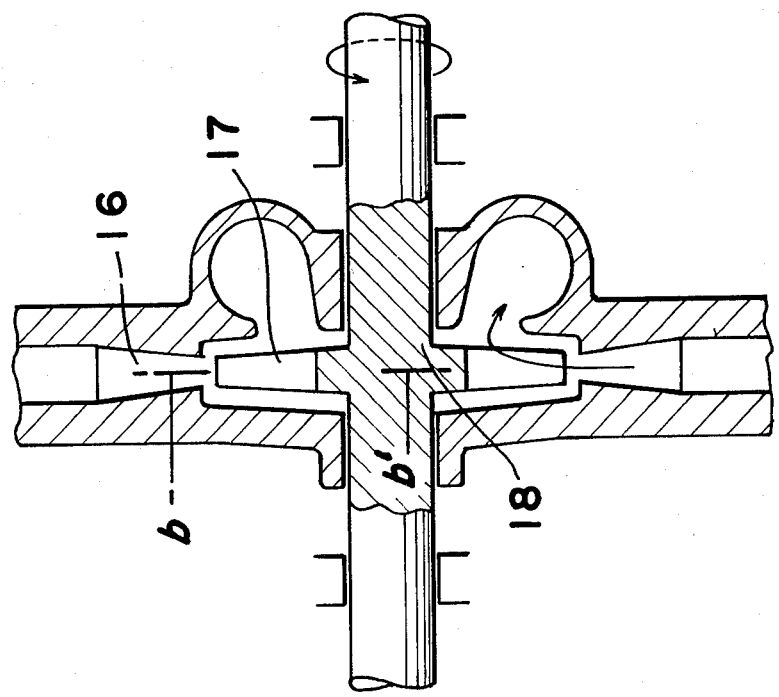
FIG. 4 is a schematic representation of another type of turbine that may be used in the present invention.

The choice of turbines which can be used in this invention is made difficult by the nature of the mixture conveyed between reactor and separator, which, when expansion has ended, consists of ethylene and droplets of polyethylene. This choice cannot be made by analogy with steam turbines because, in the case of a mixture of steam and water droplets, the ratio of specific gravities is about 1,000, whereas, under the temperature and pressure conditions prevailing between the expansion valve and the separator, the ratio of specific gravities can vary but is always less than about 5. However, several types of turbine can be used. Of course every such turbine includes a rotor, about which further discussion is unnecessary. In the context, reference is made to Perry's Chemical Engineering Handbook (4th Edition, 1963), pages 24-70 to 24-77, and to Techniques de l'Ingénieur, Mé canique et Chaleur, Vol. 2, pp. B 310-1 to B 332-9 and B 460-1 to B 462-17 (1965), for the terminology applied to these machines. The first type of turbine which can be used in this invention is a radial-inflow turbine having a reaction ratio less than or equal to ½ frequently denoted by the name Francis turbine and comprising one or more stages, preferably 4 to 12 stages. Such a turbine is schematically represented in FIG. 2 and, along the axis b-b' of the latter, in FIG. 3. In these drawings, 13 designates the nozzle, 14 a blade of the wheel and 15 the rotor. The second type of turbine which can be used is a turbine with a single quasi-radial jet, frequently denoted by the name Pelton turbine. In this type of turbine, the jet of mixture issuing from the nozzle is located in a plane which is perpendicular to the axis of the bladed wheel but is not concurrent with the axis. This turbine is schematically represented in FIG. 4 and, along the axis b-b' of the latter, in FIG. 5. In these drawings, 16 designates the nozzle, 17 a blade of the wheel and 18 the rotor. The third type of turbine which can be used is an axial-flow impulse turbine, comprising one or more stages, the angle of injection of the mixture, relative to the bladed wheel, being preferably less than 30 degrees. When using a turbine of the second or third types mentioned above, it can be advantageous to pass the mixture onto only some of the blades on the wheel, this technique being denoted by the term partial injection.

The turbine nozzle used in the above process is preferably a nozzle of the convergent-divergent type, in which the ratio S'/S of the outlet cross-section S' of the divergent part to the neck cross-section S is between 1 and 2. The nozzle can be rectangular or a body of revolution. It can be advantageous to use a nozzle of variable area, such as is provided by a body of revolution provided internally with conical-tipped rod engaged in the neck of the nozzle and controlled by a hydraulic servomotor. It is thus possible to regulate the turbine feed rate directly and it is even possible, by engaging the rod completely until the cone forms a seal on the neck of the body of revolution, to cut off the flow of drive rapidly and completely, as required by safety regulations in the event of mechanical breakdown. Also, for safety reasons, the turbine according to the invention preferably comprises at least one overspeed detecting means that is able to cause closing in a very short time, e.g. between 0.01 to 0.1 second, of the valve at the outlet of the reactor.

In the process according to the invention, the flow Q of mixture passing through the turbine does not necessarily represent the total flow of fluid leaving the reactor. However, in order to achieve the object of the invention and to use the turbine under the best conditions of efficiency, this flow Q must represent a major part, preferably at least 60%, of the flow leaving the reactor.

The remaining part of the mixture, which represents up to 40% of the flow leaving the reactor, is led through a line arranged in parallel with the turbine from the outlet of the reactor to the separator, either directly through an expansion valve or through a cold ethylene injector in accordance with the process of French Pat. No. 2,313,399, thus making it possible to achieve additional cooling of the mixture at the inlet of the separator. Quite obviously, the proportion of the mixture passed into this injector may have to be modified with time, as a function of the polymerisation conditions or in the event of shutdown of the turbine, and provision is therefore made to regulate the passage of the mixture into the injector by means of a valve. Cold ethylene feeding the injector is either taken, downstream of a heat exchanger, from the recycle line extending from the separator to a compressor provided for supplying the reactor with ethylene, or directly supplied from a distribution circuit under the desired pressure. In both cases, it is advantageous, for energy reasons, that the cold ethylene injection pressure is as low as possible; the pressure is preferably between 20 and 180 bars.

Furthermore, a particular embodiment of the invention consists of passing the flow Q of mixture leaving the last stage of the turbine through a cold ethylene injector, before it is supplied to the separator, in order to effect additional cooling of the mixture. The injector used may be of the convergent-divergent type described in French Pat. No. 2,313,399 and will be fed as indicated above.

The process according to the invention can be applied to the polymerisation of ethylene under high pressures between 800 and 2,500 bars, using a free radical yielding initiator or using a catalytic system of the Ziegler type. The invention can also be applied to the copolymerisation of ethylene with α-olefines such as propylene, but-1-ene or hex-1-ene.

When employing a free radical yielding initiator, the invention can be applied to the copolymerisation of ethylene with polar comonomers such as carbon monoxide, maleic anhydride and vinyl esters.

As is well known, it is also possible to use, in the process of the invention, one or more chain transfer agents, such as, for example, hydrogen, in order to regulate and control the characteristics of the polymer. The reaction mixture may also contain an inert diluent such as, for example, an aliphatic hydrocarbon.

The term "free radical yielding initiator" is to be understood as meaning oxygen, peroxides and peresters. The term "catalytic system of the Ziegler type" means a system comprising at least one activator selected from hydrides and organometallic compounds of a metal of group I to III of the Periodic Classification and on the other hand at least one halogenated compound of a transition metal of groups IV to VI A. Among these compounds may be cited vanadium and titanium trichlorides (the latter eventually syncrystallized with aluminum chloride in the form of $TiCl_3 \frac{1}{3} AlCl_3$) eventually laid on a support comprising for example a halide, a monohalide or a hydrohalide of magnesium. The mean residence time of the initiator or the catalytic system in the reactor, generally ranging from 5 to 80 seconds, will be easily selected by those skilled in the art in relation with the temperature in the reactor and will be shorter as the temperature is higher. These catalysts are preferably employed in the form of solutions in an inert diluent or, alternatively, in the form of a dispersion.

The process of the invention is intended to be carried out continuously and can be effected using a stirred autoclave reactor, or, alternatively, a tubular reactor.

This invention also relates to an apparatus for polymerizing ethylene, comprising a reactor, a turbine arranged at the outlet of the reactor and consisting of at least one stage successively comprising a fixed nozzle and a bladed wheel, a separator disposed at the outlet of the last stage of the turbine and comprising an outlet at its lower end for discharging the polymer, an ethylene recycle line extending from the separator to the inlet of a compressor and a line extending from the outlet of the compressor to the inlet of the reactor.

If the flow issuing from the reactor is not entirely passed through the turbine, the apparatus according to the invention further comprises a line arranged in parallel with the turbine from the outlet of the reactor to the separator and comprising an expansion valve. In this case, the apparatus of the invention may further comprise an injector comprising a convergent ejection nozzle arranged at the end of the line extending from the expansion valve, a convergent mixing zone downstream from the ejection nozzle and connected to a cold ethylene supply means, and a diffuser at the downstream end of the mixing zone and connected to the separator inlet. From the energetic standpoint, the mixing zone of the injector should advantageously be connected, through a heat exchanger and eventually an expansion valve, to the ethylene recycle line.

According to another embodiment, the apparatus of the invention may further comprise an injector as described above and arranged between the outlet of the last stage of the turbine and the inlet of the separator.

FIG. 1 is a schematic diagram of an embodiment of the apparatus according to the invention. The apparatus comprises a reactor 1, the outlet of which is connected to a turbine 3 by means of an expansion valve 2. The turbine is connected to and drives an energy producing means 13 for producing energy for use outside of the polymerization system, such as an electric generator. The turbine 3 comprises several stages 4 and reaction mixture leaving the turbine passes to is the inlet of a separator 5. The separator comprises an outlet at its lower end for discharging the polymer. From a point between valve 2 and turbine 3, a line arranged in parallel leads, through an expansion valve 6, to the ejection nozzle 7 of an injector further comprising a convergent zone 8 downstream from the nozzle 7 and a diffuser 9 at the downstream end of zone 8. The diffuser 9 is connected to the line extending from the turbine 3 to the separator 5. The gas outlet of separator 5 is connected through a heat exchanger 10 to the inlet of a compressor 12, the outlet of which is connected to the inlet of reactor 1. At the outlet of the exchanger 10, a line arranged in parallel leads to the convergent zone 8 through an expansion valve 11.

Figure 6:
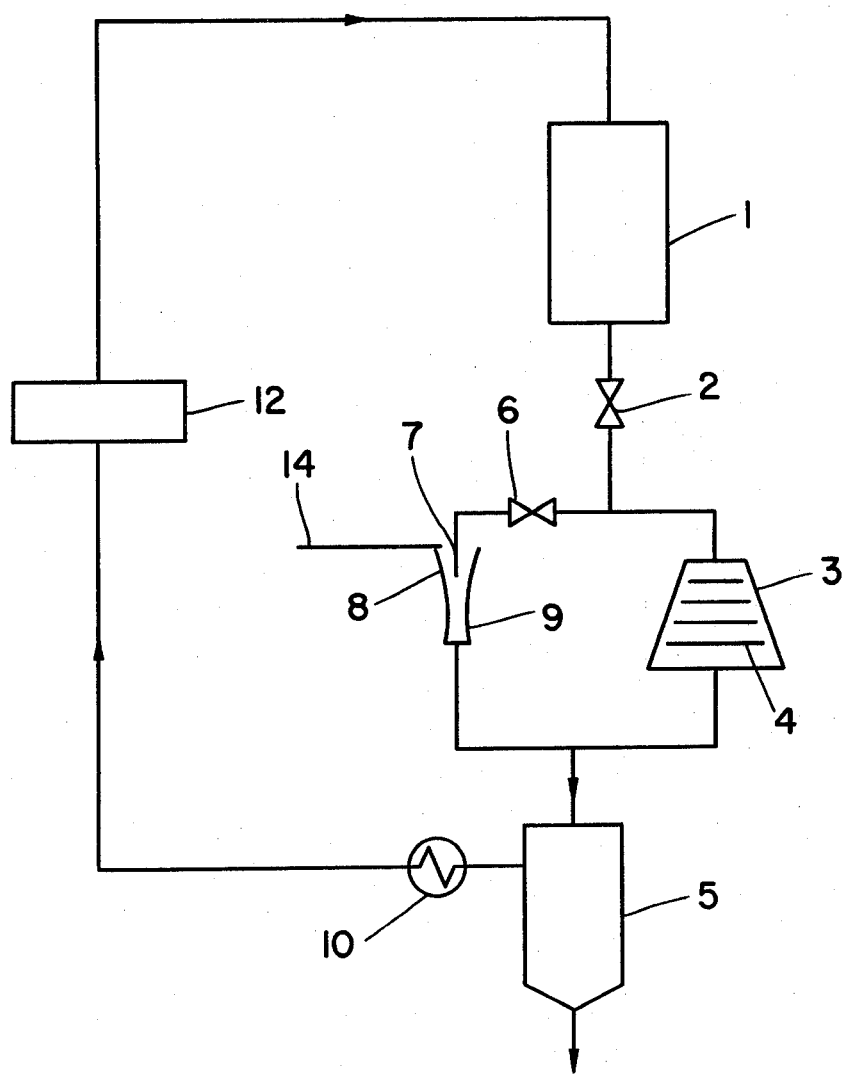
FIG. 6 is a schematic flow diagram of another embodiment according to the invention.

In FIG. 6 another embodiment of the invention is illustrated in which the recycle of cold ethylene from heat exchanger 10 is replaced by supply 14 of fresh ethylene fed from outside the system.

Figure 7:
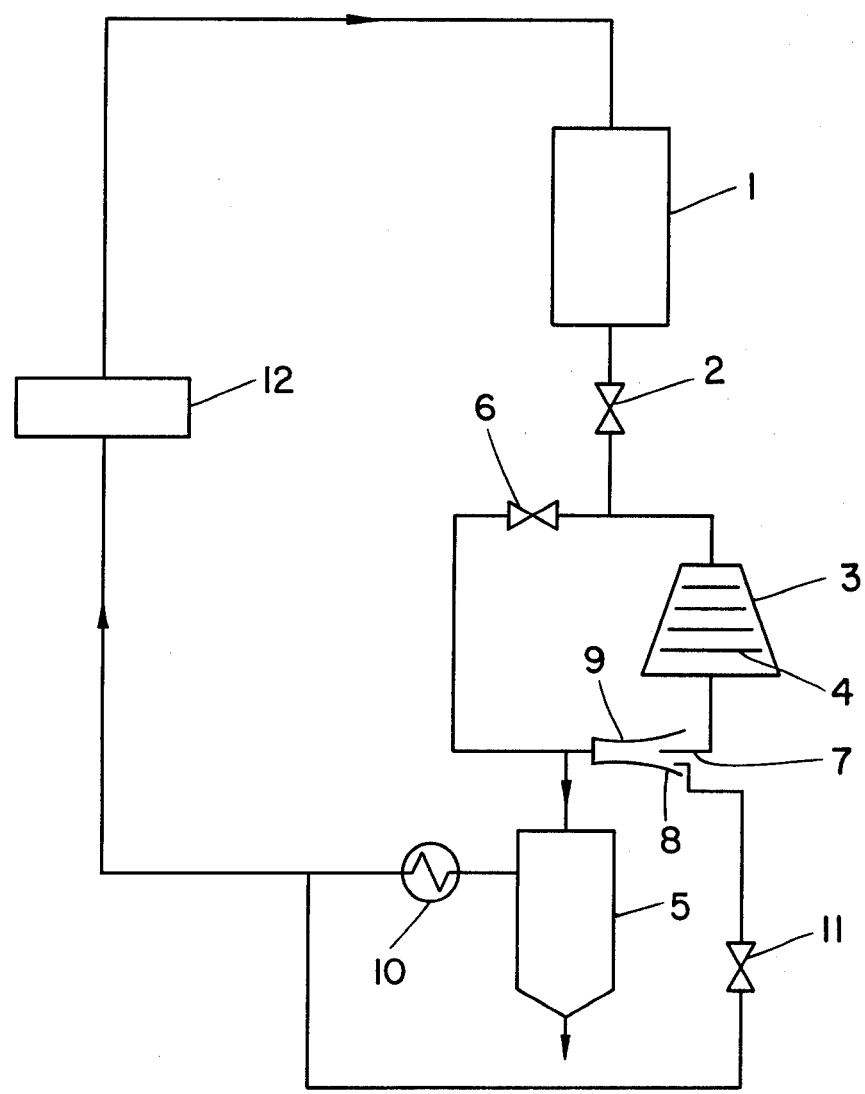
FIG. 7 is a schematic flow diagram of another embodiment of the invention.

Another embodiment of the invention is illustrated in FIG. 7. In this embodiment, ethylene is partially recycled, after passing through heat exchanger 10 and valve 11, to an injector comprising ejection nozzle 7, convergent means for mixing 8, and diffuser 9. The injector is located downstream of turbine 3 and is arranged in parallel with expansion valve 6.

What we claim is:

1. An apparatus for polymerizing ethylene and for producing energy for use outside said apparatus comprising:
   (a) a reactor comprising an inlet and an outlet, wherein said outlet discharges a mixture of ethylene and polyethylene;
   (b) a turbine comprising an inlet, at least one stage comprised of a nozzle and a bladed wheel, and an outlet after the last stage of said turbine, wherein said turbine is connected to and drives an energy producing means for producing energy for use outside said apparatus;
   (c) first conduit means connecting the outlet of said reactor with the inlet of said turbine;
   (d) a separator comprising an inlet, a first outlet, and a second outlet, wherein said first outlet discharges polyethylene and wherein said second outlet discharges a gaseous mixture comprising ethylene;
   (e) second conduit means connecting the outlet of said turbine to the inlet of said separator;
   (f) a compressor comprising an inlet and an outlet, wherein said compressor has no connection with said turbine;
   (g) third conduit means connecting said second outlet of said separator to the inlet of said compressor;
   (h) fourth conduit means connecting the outlet of said compressor to the inlet of said reactor; and
   (i) fifth conduit means, connecting said first conduit means and said second conduit means, said fifth conduit means including an expansion valve and further including an injector downstream of said expansion valve, said injector comprising a convergent ejection nozzle, a convergent means for mixing downstream from said ejection nozzle and a diffuser downstream from said means for mixing.

2. An apparatus for polymerizing ethylene and for producing energy for use outside said apparatus comprising:
   (a) a reactor comprising an inlet and an outlet, wherein said outlet discharges a mixture of ethylene and polyethylene;
   (b) a turbine comprising an inlet, at least one stage comprised of a nozzle and a bladed wheel, and an outlet after the last stage of said turbine, wherein said turbine is connected to and drives an energy producing means for producing energy for use outside said apparatus;
   (c) first conduit means connecting the outlet of said reactor with the inlet of said turbine;
   (d) a separator comprising an inlet, a first outlet, and a second outlet, wherein said first outlet discharges polyethylene and wherein said second outlet discharges a gaseous mixture comprising ethylene;
   (e) second conduit means connecting the outlet of said turbine to the inlet of said separator, said second conduit means including an injector comprising a convergent ejection nozzle, a convergent means for mixing downstream from said ejection nozzle and a diffuser downstream from said means for mixing;
   (f) a compressor comprising an inlet and an outlet, wherein said compressor has no connection with said turbine;
   (g) third conduit means connecting said second outlet of said separator to the inlet of said compressor;
   (h) fourth conduit means connecting the outlet of said compressor to the inlet of said reactor; and
   (i) fifth conduit means connecting said first conduit means and said second conduit means, said fifth conduit means including an expansion valve.

3. Apparatus according to claim 1 or 2, wherein the turbine is an axial-inflow turbine having a reaction ratio less than or equal to ½ and comprising from 4 to 12 stages.

4. Apparatus according to claim 1 or 2, wherein the turbine is an axial-flow impulse turbine, the wheel of which makes with the injection direction of the mixture an angle less than 30 degrees.

5. Apparatus according to claim 1 or 2, wherein the turbine is a Pelton turbine having a single quasi-radial jet.

6. Apparatus according to claim 1 or 2, wherein the nozzle of the turbine is of the convergent-divergent type, and in which the ratio $S'/S$ of the outlet cross-section $S'$ of the divergent part to the neck cross-section $S$ is between 1 and 2.

7. Apparatus according to claim 1 or 2, wherein the nozzle of the turbine is a body of revolution of variable area and is provided internally with a conical-tipped rod engaged in the neck of said nozzle and controlled by a hydraulic servomotor.

8. Apparatus according to claim 1 or 2, wherein the rotation speed of said bladed wheel is between 12,000 and 40,000 rpm.

9. The apparatus of claim 1 or 2, wherein said apparatus includes a source of cold ethylene connected to said convergent means for mixing in said injector.

10. The apparatus of claim 1 or 2, wherein said third conduit means includes heat exchange means for cooling recycled ethylene, and wherein said apparatus includes a sixth conduit means in flow communication with said third conduit means downstream of said heat exchange means and in flow communication with said convergent means for mixing in said injector.

* * * * *